United States Patent
Parker

(10) Patent No.: US 7,324,786 B2
(45) Date of Patent: Jan. 29, 2008

(54) METHOD AND APPARATUS FOR INCREASING THE NUMBER OF STRONG EIGENMODES IN A MULTIPLE-INPUT MULTIPLE-OUTPUT (MIMO) RADIO CHANNEL

(75) Inventor: Steve Carl Jamieson Parker, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 510 days.

(21) Appl. No.: 10/713,193

(22) Filed: Nov. 17, 2003

(65) Prior Publication Data

US 2004/0162034 A1  Aug. 19, 2004

(30) Foreign Application Priority Data

Dec. 21, 2002  (GB) ................ 0230030.9

(51) Int. Cl.
*H04B 1/00* (2006.01)
(52) U.S. Cl. .................... 455/69; 455/562.1
(58) Field of Classification Search ............ 455/69, 455/88, 562.1; 342/368, 372; 343/815, 343/817–819
See application file for complete search history.

(56) References Cited

U.S. PATENT DOCUMENTS

2002/0085643 A1  7/2002  Kitchener et al.
2002/0127978 A1  9/2002  Khatri
2002/0158798 A1*  10/2002  Chiang et al. .............. 342/372

FOREIGN PATENT DOCUMENTS

| DE | 43 13 395 | 11/1994 |
| EP | 1 227 539 | 7/2002 |
| GB | 2 238 177 | 5/1991 |
| WO | WO 02/13310 | 2/2002 |

OTHER PUBLICATIONS

D. Gesbert, et al., IEEE Global Telecommunications Conference, vol. 2 of 4, pp. 1083-1088, XP-001017251, "MIMO Wireless Channels: Capacity and Performance Prediction", Nov. 27, 2000.

* cited by examiner

*Primary Examiner*—Lee Nguyen
(74) *Attorney, Agent, or Firm*—Oblon, Spivak, McClelland, Maier & Neustadt, P.C.

(57) ABSTRACT

The invention provides a system for implementing a high capacity MIMO system with high throughput which will ensure an eigenmode rich channel largely irrespective of the environment. In conventional MIMO systems, the environment can substantially reduce the theoretically achievable throughput if there is little angular diversity. The system includes a scattering structure for scattering beams emitted by an antenna array to provide good angular diversity at the receiver and hence good throughput in all environments. In addition, the scattering structure is controllable to allow its properties and hence the eigenmodes generated to be varied to maximise the efficiency of the system.

22 Claims, 2 Drawing Sheets

METHOD AND APPARATUS FOR INCREASING THE NUMBER OF STRONG EIGENMODES IN A MULTIPLE-INPUT MULTIPLE-OUTPUT (MIMO) RADIO CHANNEL

FIELD OF INVENTION

The present invention relates to communication systems and more particularly to systems utilising the Multiple-Input Multiple-Output (MIMO) radio channel communication method.

BACKGROUND OF THE INVENTION

Conventional communication systems have relied upon a single antenna transmitter and single antenna receiver system. However, such systems have a capacity which is fundamentally limited for a given bandwidth and signal-to-noise ratio of the received signal. The use of multiple antennas at the receiver and transmitter (MIMO) extends the system into the spatial domain and fundamentally increases its capacity. A system may then be designed which has a larger potential throughput. A system which has equal numbers of transmit and receive antennas has an inherent capacity which scales approximately linearly with the number of antennas. This is achieved by reuse of the same temporal/spectral channel using independent spatial propagation modes that may be separated at the receiver through signal processing. Consequently such radio systems are becoming increasingly important.

However, the linear relationship between antenna number and fundamental capacity is an over-simplification. In practice, to realise this potential capacity, the receiver has the task of separating the interfering spatial sub-channels. This requires the receiver to determine a sufficient number of independent equations which may be solved to isolate the spatial sub-channels. With current systems, this requires that several unique spatial propagation modes, known as eigenmodes, exist which connect the transmitter and receiver. If the number of strong eigenmodes is lower than the number of transmit (or receive elements) then the potential capacity of the system is reduced.

A channel contains a large number of spatial eigenmodes when there are a large number of rays with a large angular separation that connect the transmitter and the receiver. This situation occurs when a number of scatterers, i.e. objects causing scattering of the transmitted signal, are located around the antennas. FIG. 1 shows how the performance of an uncoded BLAST (Bell Labs Layered Space-Time) architecture, with 6×8 MIMO channel, is degraded (bit error rate (BER) increases) when the angular diversity is small. These results were obtained using a wide sense stationary uncorrelated scattering (WSSUS) channel model. An aim of the present invention is to reduce the performance difference between these two extremes.

Digital beamforming can be used to increase the spatial separation of signals (or to increase the angular acceptance of the receive array). However, this system requires complex digital processing electronics for conditioning the signals prior to feeding to the antenna array for transmission.

With current MIMO systems, there is a danger than the potential throughput may not be achieved in a given environment where sufficiently strong eigenmodes cannot be established to support the multiplexed spatial sub-channels. Consequently, there is a danger that such a system may perform no better or potentially worse than a single antenna system. Thus the considerable investment in a multi-antenna system may not provide any return.

SUMMARY OF THE INVENTION

Therefore according to the present invention there is provided a transceiver comprising: an antenna array having a plurality of antennas and a scattering structure associated with the antennas for receiving the signals from the antennas. The invention also provides a transceiver comprising: an antenna array having a plurality of antennas; and a scattering structure associated with the antennas for receiving incoming signals and passing them on to the array of antennas.

The scattering structure scatters the signals from the transmit antenna array to provide good angular diversity at a receiver. Similarly, a scattering structure may be used at the receiver to increase the angular acceptance of the receive array. Potentially this can provide good decorrelation between each of the sub-channels without adversely affecting the power throughput.

The present invention preferably includes a scattering or waveguide structure or structures which may be dynamically adjusted to vary the eigenmodes established between the transmitter and receiver. In this way, the throughput may be improved by varying the scattering in the hope of establishing stronger eigenmodes. Preferably, the transceiver includes a controller for controlling the scattering structure. Ideally, the controller receives information fed back from the receiver to determine whether and how to adjust the scattering structure.

The scattering structure may achieve scattering of the beams from the antennas in any number of ways including, for example, by diffraction, reflection, scattering or refraction, or a combination of them.

In one embodiment, the structure may be formed as a diffraction grating for diffracting the beams. This may be formed from a series of slits formed in a sheet of material, wherein the slits have a different refractive index or absorption coefficient to the spaces between the slits. The slits are preferably adjustable, in their spacing or shape, to provide the adjustment function. Beneficially, two or more diffraction gratings may be used in series to provide further control over the diffraction process. One or more of these may be adjustable.

The present invention also provides a method of scattering signals produced by an array of antennas, the method comprising: interposing a scattering structure between the antennas and a receiver to scatter the beams produced by the antennas, receiving feedback information concerning the strength of the eigenmodes established between the antennas and a receiver; and adjusting the scattering structure to vary the scattering of the beams produced by the antennas.

The present invention relies upon the importance of having diverse paths or eigenmodes between the transmitter and receiver. This is in contrast to traditional single antenna systems where multipath is problematic and so normally avoided.

The present invention provides a system which provides high capacity, by searching out the best propagation modes that exist in any given environment. This is achieved without the need for complex and expensive circuitry such as that used for digital or analogue beamforming. The present invention instead utilises a simple structure, which is separate from the main antenna thereby providing more degrees of freedom for optimisation, to provide an eigenmode rich channel regardless of the local environment. This will allow a lower cost system with simpler installation since the installer need pay less attention to the radio environment and so the location of the access point.

The arrangement of the present invention also allows for the possibility of three-dimensional packing of antennas.

BRIEF DESCRIPTION OF THE DRAWINGS

The present invention will now be described in more detail with reference to the attached drawings in which:—

DETAILED DESCRIPTION

Figure 1:
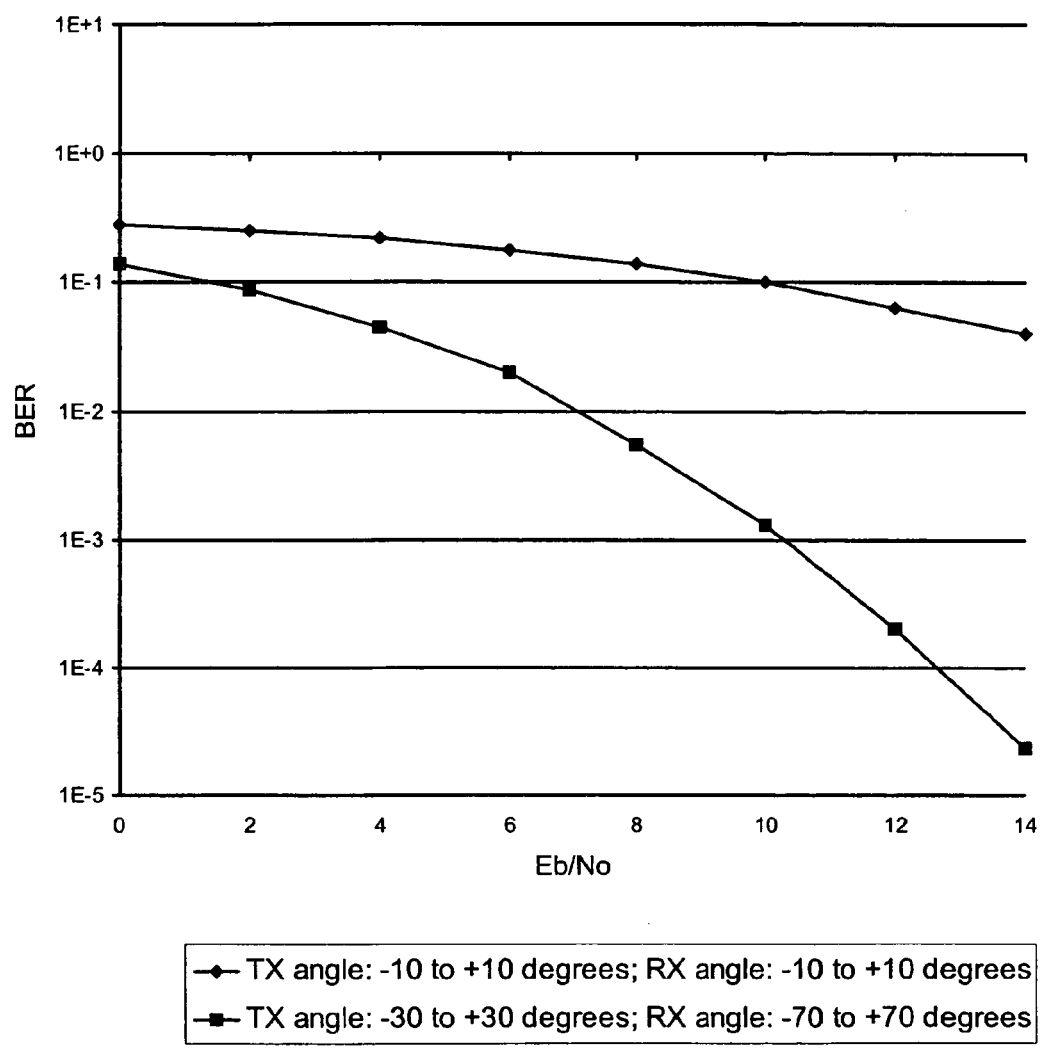
FIG. 1 is a graph showing the affect of angular diversity on the performance of an uncoded BLAST system.
Figure 2:
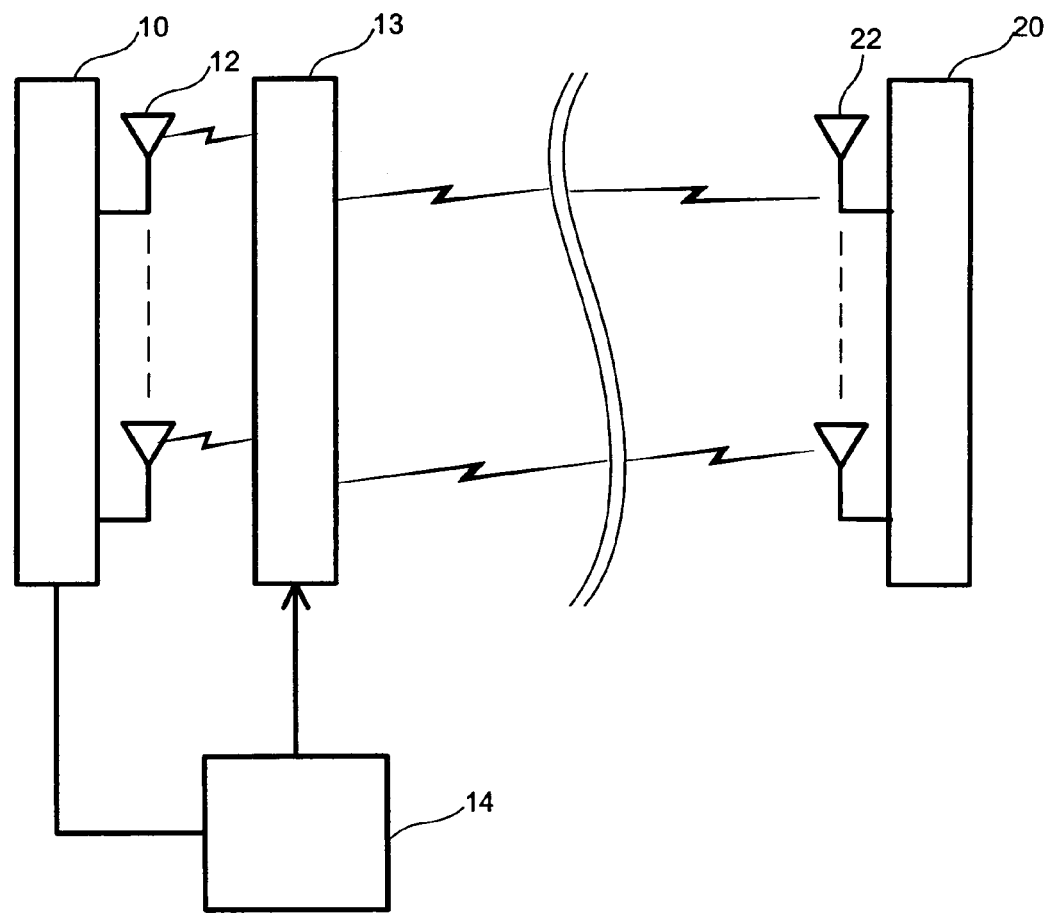
FIG. 2 shows a schematic embodiment of a communication system of the present invention.

FIG. 2 shows schematically an arrangement of an embodiment of the present invention. Although the system is a bidirectional system, the following description will concentrate only on communication in one direction with the transceiver 10 on the left acting as transmitter and the transceiver 20 on the right acting as receiver. FIG. 2 shows a scattering structure 13 arranged adjacent to the array of antennas 12. No scattering structure is shown for the receiver although one could be provided if desired although this is not essential.

In a real-world environment, such as in an office, an access point (AP) is typically located in a convenient location to prevent inconvenience to users. Typically these are mounted on a ceiling. In contrast terminals, particularly mobile terminals, are often located amongst everyday objects of an office. Consequently, the terminals will normally be surrounded by scatterers and the diversity of signals will be sufficient. In contrast, the AP is located away from any scatterers and so signals emanating from it are unlikely to encounter scatterers in its proximity. In this example, the present invention can be applied to the AP to improve the angular spatial diversity and hence achieve a throughput which is closer to the theoretical maximum channel capacity. Using this example, the AP is represented by the transmitter 10 and the mobile terminal by the receiver 20.

In use, the transmitter processes the signal to be transmitted and divides this up into the various sub-channels ready for transmission by respective antennas 12. The signals are fed to the antennas 12 of the array to transmit the signal. The scattering structure 13 in this embodiment is a diffraction grating although any structure which causes scattering of the incident signals could be used. The signals impinge on the diffraction grating causing scattering. This scattering can be controlled to couple energy into the strongest spatial eigenmodes supported by the channel.

In FIG. 2 the diffraction grating is shown as a single structure. The grating may be a single structure or formed from a number of separate gratings. The antenna array 12 may adopt many different geometries, such as linear, planar or circular and the grating may be formed into a structure surrounding the antennas. As indicated above, the grating may consist of a regular periodic structure or it may have a more complex structure to diffract the incident energy in a designed way (e.g. several diffraction orders of nominally equal strength). The scattering structure is shown in FIG. 2 located in close proximity to the antenna array (but far enough away to be in far-field of the antennas). This is practically convenient in terms of providing a convenient package. In this way, the structure could be located near the antenna array module in a convenient joint housing.

The transmission diffraction grating of this embodiment, located at the aperture of the receiving antenna module, is used to split the incident beam into several diffraction orders which would have angular diversity. A second grating can be used to further spread the incident beam so that, from the perspective of the receiver antenna elements the incident beam has emanated from several virtual source points located around the receiver.

Once the transmitted signals from the antennas have passed through the scattering structure, they are received by the antennas 22 at the receiver, e.g. a mobile terminal. The receiver 20 decodes the received signal to determine the quality of the eigenmodes established between the transmitter and the receiver. The receiver can then transmit the determined quality information back to the transmitter 10. The quality information is extracted and used to adjust the scattering structure. The controller 14 then receives this information and adjusts the scattering structure to modify the grating and thereby vary the eigenmodes developed. For example, the slot spacing and size may be physically modified to bring about a variation in the eigenmodes.

In order to maximise the throughput, the system must establish eigenmodes which have good power efficiency. If weak eigenmodes are established then their poor power transmission will reduce the inherent capacity of that subchannel. Furthermore, if the terminal moves or objects within the environment move then the transmission paths may change significantly and so dynamic control over the established eigenmodes helps to overcome this. In this way, the signals fed back from the receiver allow the scattering structure to be adjusted to establish strong eigenmodes with high fundamental capacity. By monitoring the received signals and feeding back information from the receiver, the controller 14 can adjust the established modes to maintain high throughput.

As indicated above, a second diffraction grating may be used to further enhance the angular diversity of the signals passing through it. However, this could be taken further and three or more gratings may be used. In order to adjust the eigenmodes developed by the system one or more of such gratings may be adjustable to allow increased flexibility. Furthermore, the scattering structure could be divided up into separate sections, each individually adjustable.

The embodiment described above uses a diffraction grating to increase the angular diversity of the signals passing through it. However, the invention is equally applicable for use with other scattering elements which reflect, refract, diffract or otherwise scatter the incident beam. Furthermore, a combination of devices may be used to perturb the incident radiation.

The above embodiment has been described in respect of transmission primarily in one direction. However, the system is fully capable of operating in reverse with the unit 20 transmitting to the unit 10. The signals impinge on the scattering structure in a similar way albeit form the antennas 22 but the effect is still provided so that the antennas 12 'see' the transmitting antennas as spaced apart virtual sources. As indicated, feedback information would be provided to the transceiver with the scattering structure to allow dynamic adjustment. Again, if both transceivers are provided with a scattering structure, then feedback information can be passed in both directions.

The present invention can also be used overcome an interferer. If an interferer is affecting the reception of a sub-channel, the scattering structure can be adjusted to modify the eigenmodes and so avoid using the sub-channel suffering the interference. In this way the interfering signal can be rejected by the receiver.

The present invention has been described primarily in respect of providing a scattering structure adjacent to the transmitting antenna array. However, the principles of the present invention can be applied where the scattering structure is provided adjacent to the receiving antenna. In this way, rather than providing angular diversity as the signals leave the transmitter structure, the scattering structure effectively defines angularly diverse receive paths for the receiver. This ensures that signals received from the transmitter are angularly diverse, thereby enhancing the capacity of the system.

In this arrangement, the scattering structure can be controlled in a similar way to optimise the eigenmodes between the transmitter and the receiver.

I claim:

1. A MIMO transceiver comprising:
   an antenna array having a plurality of antennas;
   a scattering structure, associated with the plurality of antennas, configured to
      receive the signals from the plurality of antennas, and
      to increase path diversity associated with the transceiver; and
   a controller configured to control the scattering structure to modify the eigenmodes formed between the transceiver and a receiver.

2. A transceiver according to claim 1, wherein the scattering structure is a passive structure.

3. A transceiver according to claim 1, wherein the scattering property of the scattering structure can be externally adjusted.

4. A transceiver according to claim 1, wherein the scattering structure scatters the incident signals by at least one of diffraction, reflection or refraction or use of a wave-guide.

5. A transceiver according to claim 1, wherein the scattering structure is a diffraction grating.

6. A transceiver according to claim 1, wherein the scattering structure comprises one or more scattering elements, each associated with one or more of said antennas.

7. A communication system including a transceiver according to claim 1.

8. A MIMO transceiver comprising:
   an antenna array having a plurality of antennas;
   a scattering structure, associated with the plurality of antennas, configured
      to receive the signals from the plurality of antennas, and
      to increase path diversity associated with the transceiver; and
   a controller configured to receive feedback information from the receiver and to use the feedback information to control the scattering structure.

9. A transceiver for use with a second transceiver comprising an antenna array having a plurality of antennas and a scattering structure associated with the antennas for receiving the signals from the antennas, the transceiver having
   an antenna array having a plurality of antennas;
   feed back means for generating feedback information about the properties of the signals received by the antenna array; and
   transmission means for sending said feedback information to said second transceiver for adjusting said scattering structure.

10. A communication system comprising a first transceiver and a second transceiver, the second transceiver comprising:
    a second transceiver antenna array having a plurality of antennas;
    a scattering structure associated with the antennas for receiving the signals from the antennas; and
    a controller for controlling the scattering structure, and the first transceiver comprising:
    a first transceiver antenna array having a plurality of antennas;
    feed-back means for generating feedback information about the properties of the signals received by the first transceiver antenna array; and
    transmission means for sending said feedback information to said second transceiver for adjusting said scattering structure.

11. A method of scattering signals produced by an array of antennas, the method comprising:
    interposing a scattering structure between the antennas and a receiver to scatter the beams produced by the antennas,
    receiving feedback information concerning the strength of the eigenmodes established between the antennas and a receiver; and
    adjusting the scattering structure to vary the scattering of the beams produced by the antennas.

12. A method according to claim 11, wherein the scattering structure is a passive structure.

13. A method according to claim 11, wherein the scattering structure scatters the incident signals by at least one of diffraction, reflection or refraction.

14. A method according to claim 11, wherein the scattering structure is a diffraction grating.

15. A method according to claim 11, wherein the scattering structure comprises one or more scattering elements, each associated with one or more of said antennas.

16. A MIMO transceiver comprising:
    an antenna array having a plurality of antennas; and
    a scattering structure, associated with the plurality of antennas, configured
       to receive and forward incoming signals to the antenna array, and
       to increase path diversity associated with the transceiver; and
    a controller configured to control the scattering structure to modify the eigenmodes formed between the transceiver and a transmitter.

17. A transceiver according to claim 16, wherein the scattering structure is a passive structure.

18. A transceiver according to claim 16, wherein the scattering property of the scattering structure can be externally adjusted.

19. A transceiver according to claim 16, wherein the scattering structure scatters the incident signals by at least one of diffraction, reflection or refraction or use of a wave-guide.

20. A transceiver according to claim 16, wherein the scattering structure is a diffraction gating.

21. A transceiver according to claim 16, wherein the scattering structure comprises one or more scattering elements, each associated with one or more of said antennas.

22. A MIMO transceiver, comprising:
    an antenna array having a plurality of antennas; and
    a scattering structure, associated with the plurality of antennas, configured to receive and forward incoming signals to the antenna array, and
to increase path diversity associated with the transceiver; and
a controller configured to analyze the received signal and use an analysis result to control the scattering structure.

* * * * *